June 9, 1964  Q. A. KERNS  3,136,902
TUNNEL DIODE DISCRIMINATOR CIRCUIT
Filed April 18, 1962

INVENTOR.
QUENTIN A. KERNS
BY
ATTORNEY.

United States Patent Office 3,136,902
Patented June 9, 1964

3,136,902
TUNNEL DIODE DISCRIMINATOR CIRCUIT
Quentin A. Kerns, Orinda, Calif., assignor to the United States of America as represented by the United States Atomic Energy Commission
Filed Apr. 18, 1962, Ser. No. 188,595
9 Claims. (Cl. 307—88.5)

The present invention relates to electronic pulse circuitry and more particularly to an amplitude sensitive pulse discriminator for eliminating input pulses having an amplitude below a pre-set minimum and for providing accurately timed output pulses of uniform amplitude.

Many different pulse height discriminator circuits have been developed for various purposes and accordingly considerations such as cost, physical size, reliability etc., as well as circuit characteristics must be weighted when selecting a circuit for usage in a particular situation. Recent developments in the field of nuclear physics have emphasized a still further consideration. In this field the rapidity at which the detection and counting of nuclear particles must be made is constantly increasing. Since many forms of counter require pulse discriminators to select desired counts from extraneous signals, a circuit is needed which is capable of handling very rapidly occurring pulses. The forms of rapidity which are required include the ability to handle very closely spaced sequential input pulses, minimum delay time within the discriminator and, importantly, a fixed timing of the output pulse relative to the corresponding input pulse irrespective of variations in the amplitude of the latter.

The present invention is particularly suited for use in nuclear counting circuitry since it can function very rapidly as defined above, but does not utilize a large number of components so that the above-mentioned factors of cost, size, and reliability are favorable.

When detecting nuclear particles with a scintillation crystal and a photomultiplier tube, it is often desirable to eliminate low amplitude pulses which may result from low energy particles of no interest or which may be caused by fluctuations in tube dark current. Thus, in some instances it may be necessary to set the threshold of discrimination at a high amplitude level, thereby counting only the high energy pulses. In pulse height analyzers, many discriminators, set at increasing threshold levels, are included to obtain more precise information concerning the energy range of particles. The variation in amplitude of input pulses passing through a discriminator may be as high as 100 to 1, but for proper functioning of subsequent counting circuit the amplitude of the output pulses must be nearly uniform. It is further required that the timing of the output pulses relative to that of the input pulses be stable over a wide range of input pulse amplitudes. The problem of obtaining precise timing information from radiation counters is complicated by the statistical nature of the light output from such detection means as scintillation plastics, by the gain characteristic of the photomultiplier tubes which are used therewith, the large dynamic range of scintillation light encountered and the rise time of the photomultiplier output pulses, which rise time may extend over several nanoseconds. In the electronic circuitry associated with the detector it is desirable to extract all the timing information contained in the output pulse of the photomultiplier and supply this information in a useful form to other circuits with no dead time. For timing information, a highly useful form for this output pulse is a digital type of pulse having the same shape and amplitude regardless of the photomultiplier pulse shape and amplitude, for this relaxes the dynamic range requirements of subsequent electronic circuitry.

The present invention is a discriminator which eliminates input pulses below a pre-selected amplitude and provides uniform amplitude output pulses for input pulses varying in amplitude over a large range, these results being obtained in a rapidly acting circuit which provides highly accurate timing information. The invention uses a tunnel semiconductor diode in one arm of a bridge circuit. Tunnel diodes characteristically have a constant resistance when back biased and for low forward voltages. As the forward voltage is increased from zero voltage, at some particular value the current reaches a peak and the tunnel diode thereafter exhibits negative resistance over a range of higher impressed voltages. The negative resistance effect ceases at some still higher forward voltage, the current reaching a minimum or "valley," and for any higher voltages the diode again assumes the characteristic of an essentially linear resistance but with the current voltage curve displaced along the voltage axis. Since the resistance of a diode biased below the negative resistance region is nearly constant, the bridge can be balanced under such condition by an appropriate resistance in another arm of the bridge. Input pulses which do not overcome the difference between the bias voltage and the negative resistance region are cancelled and eliminated. Input pulses which exceed such difference cause the diode to conduct in the negative resistance region and the bridge is unbalanced.

With application of a gradually increasing voltage to the bridge, the bridge remains balanced as long as the tunnel diode is functioning below the negative resistance region. When the input voltage reaches the negative resistance region, an output signal is produced. Above the negative resistance valley the current voltage characteristic of the tunnel diode has approximately the same slope as below the negative resistance region. Thus the bridge remains unbalanced by a constant amount even for very large signals and an output signal of nearly constant amplitude is thus produced from input signals having amplitudes varying over a wide range.

To accurately synchronize the start of the output pulse with the start of an input pulse, a clipping line may be included in the input circuitry of the invention, so that, for example, a negative input pulse is converted into a zero-crossing signal first swinging in a negative direction and then swinging in a positive direction. The circuit is arranged so that the bridge output signal, produced by the negative resistance portion of the tunnel diode characteristic, occurs when the zero-crossing signal changes from negative to positive. It is at such point that the most stable time relationship between the start of the input pulse and the start of the bridge output pulse is obtained over a wide range of input pulse amplitudes.

Therefore it is an object of the present invention to provide a more rapid and accurate pulse discriminator circuit for eliminating input pulses below a pre-selected amplitude.

It is another object of the invention to provide a discriminator producing an output pulse a fixed time after the start of an input pulse where the input pulses have a wide range of amplitude.

It is another object of the present invention to provide an efficient discriminator having a minimum number of components and low power supply current drain.

It is yet another object of the present invention to provide a discriminator having small physical size.

It is another object of the present invention to provide a new amplitude discriminator circuit having a constant output amplitude over a wide range of input signal amplitudes.

The invention will be better understood by reference to the accompanying drawing of which:

Figure 1:
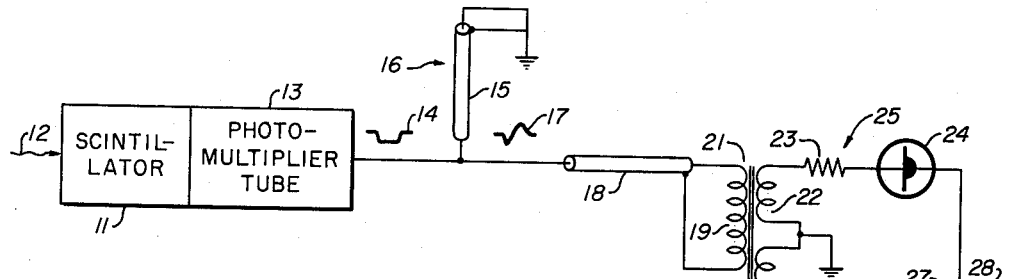
FIGURE 1 is a circuit diagram of a first embodiment of the invention as utilized with a radiation detector of the class having a phototube viewing a scintillator.

Referring now to FIGURE 1, there are shown the elements of a scintillation detector which include a scintillator 11 which is caused to emit light by the passage therethrough of an energetic charged particle 12. The scintillator 11 is viewed by a photomultiplier tube 13 which produces a detector signal, having voltage waveform 14 in response to light produced in the scintillator. One end of a coaxial clipping line 16 is connected to the output of the photomultiplier 13 while the opposite end of the clipping line is shorted to the grounded shield 15 thereof. A portion of the photomultiplier tube 13 detector signal 14 travels down the clipping line 16 and is reflected back 180 degrees out of phase. Thus, a zero-crossing signal 17 is produced where the voltage first swings negative and then positive, the positive voltage being the inverted input signal reflected from the shorted line 16.

The clipping line zero-crossing signal 17 is coupled through a coaxial line 18 to the primary winding 19 of a transformer 21. It is important for operation with fast pulses that the primary winding 19 be well balanced, inductively and capacitively, with respect to a secondary winding 22. The secondary winding 22 of the transformer 21 is center tapped to ground, the two portions of the secondary winding 22 being balanced and being the first and second arms of a bridge which includes third and fourth arms. In a fourth arm of the bridge, a current limiting and stabilizing resistor 23, in series with a tunnel diode 24 is coupled to one side of the secondary winding 22, the cathode of the diode being connected toward the secondary winding 22. If the resistance of the tunnel diode 24 is quite low, balancing of the bridge is facilitated by including resistor 23. A balancing resistor 26 in a third arm of the bridge is connected to the other side of the secondary winding 22 and has a resistance value equal to the combined series resistance of the current limiting resistor 23 and the resistance of the tunnel diode 24 below the negative resistance region.

The third and fourth arms of the bridge are connected to a common tie point 27. Input signals to the transformer 21 are cancelled in the bridge and no signal appears at tie point 27. If the amplitude of a signal applied to the transformer 21 drives the tunnel diode 24 into negative resistance, a bridge output signal 28 is obtained at the tie point 27.

Bias voltage is supplied to the tunnel diode 24 through a bias resistor 29 connected from the point 27 to the movable arm of a potentiometer 31. The potentiometer 31 is connected from a positive twelve volt terminal 32 to a negative twelve volt terminal 44, thus any desired bias potential within the range may be selected. Filtering of the bias voltage is obtained by connecting a filter capacitor 33 from the movable arm of the potentiometer 31 to ground.

The bridge output pulse 28 at point 27 is differentiated by being passed through a small capacitor 34 to the emitter 36 of a grounded base PNP transistor 37. The emitter 36 of the PNP transistor 37 is biased by first and second series resistors 38 and 39 connected from the emitter to the twelve volt terminal 32. A filter capacitor 41 is connected from the juncture of the resistors 38 and 39 to ground to maintain such juncture at a constant potential. Operating voltage is supplied to the collector 42 of the transistor 37 through a collector resistor 43 connected to the negative twelve volt terminal 44. Output signals for subsequent circuitry are available at an output terminal 46 connected through an output capacitor 47 to the collector 42.

When the bridge output waveform 28 is differentiated in the capacitor 34, a differentiated waveform 48 is produced. Such waveform 48 has a positive peak 49 followed by a negative peak 51, corresponding to the rise and fall of bridge output pulse 28. The negative peak is removed in the transistor 37, since the emitter and base function as a diode, leaving only the positive peak 49 which appears at the output terminal 46 as an amplified waveform 52. The circuitry associated with the transistor 37 is not essential in every application of the invention, but is a generally preferred output circuit for the bridge 25.

Figure 2:
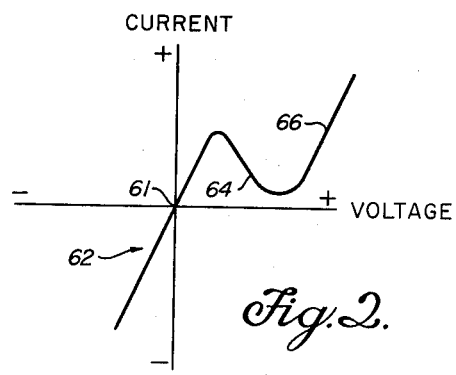
FIGURE 2 is a current voltage curve for a typical tunnel diode.

Referring now to FIGURE 2, there is shown the typical current-voltage waveform 62 for the tunnel diode 24. When the voltage across the tunnel diode 24 is negative, the waveform 62 is a straight line passing through the origin 61, thus being equivalent to the waveform of a fixed resistance. In the positive voltage region, the curve has a negative resistance region 64 at low positive voltages, thereafter being a nearly straight line 66.

Considering now the operation of the invention, assume that the various operating potentials are applied, that the movable arm of the potentiometer 31 has been set at some selected bias voltage, and that a charged particle 12 causes the scintillator 11 to emit light. The light is detected by the photomultiplier 13, the photomultiplier producing an output pulse 14 which is clipped in the clipping line 16, thereby producing the zero-crossing signal 17. The zero crossing signal 17 is applied to the primary 19 and thereby to the secondary winding 22, there being two identical signals produced in each arm of the bridge 25. If the amplitude of the signal is low enough that the bias of the tunnel diode 24 is not exceeded, then the signals cancel at point 27 and there is no output signal from the bridge 25. If however the zero crossing signal 17 to the transformer 21 has sufficient amplitude to overcome the bias of the diode 24, the diode operates in the negative resistance portion of its curve and the bridge is unbalanced. A signal having the bridge output waveform 28 is produced and is applied to the emitter of the transistor 37 through the small differentiating capacitor 34.

It will be noted by reference to FIGURE 2 that the voltage curve 62 on either side of the negative resistance region 64 has the same slope. Thus, as the voltage rises along the curve 62, the bridge is balanced until the negative resistance region 64 is reached. After crossing the negative resistance region 64 the bridge remains unbalanced but with a constant difference which provides the useful output signal.

Improved operation of the invention is obtained if the bridge output pulse 28 is produced only by the positive portion of the clipping line signal 17 in the manner described above. When a large range of pulse amplitudes is to be received, such clipping of the signal provides better time stability.

Figure 3:
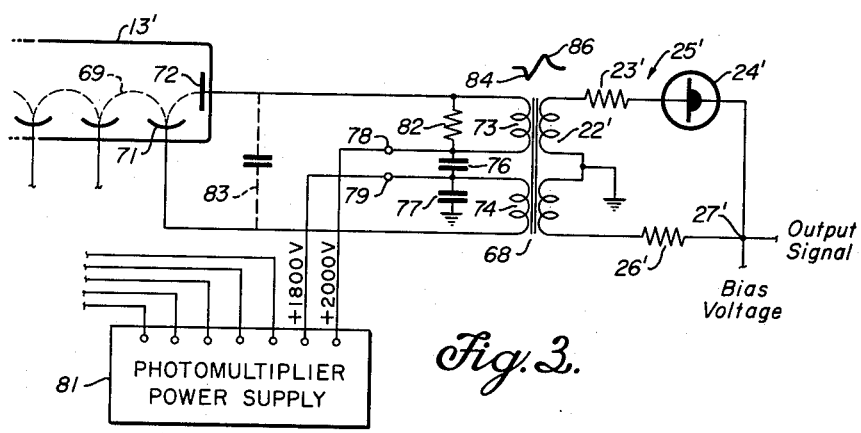
FIGURE 3 is a circuit diagram of a second embodiment of the invention.

In FIGURE 3 there is shown another embodiment of the invention wherein a zero-crossing signal 17 is obtained by a lumped constant, LCR circuit rather than a clipping line. A portion 13' of the photomultiplier tube 13 is shown with some of the dynodes and anode thereof being indicated. The path of the electrons in the tube is shown by dashed line 69. The output signal is taken across the last dynode 71 and the anode 72. In a transformer 68, a first primary winding 73 and an identical second primary winding 74 are connected in phase and in series, insofar as high frequencies are concerned, by a center tap capacitor 76. A pair of high voltage terminals 78 and 79 at each side of the center tap capacitor 76 are coupled to appropriate direct current potentials supplied by a photomultiplier power supply 81. The other end of first primary winding 73 is connected to the anode 72 while the other end of second primary winding 74 is connected to the dynode 71, thus the primary windings couples operating potentials to such photomultiplier electrodes.

The center tap between the first primary winding 73 and second primary winding 74 is effectively grounded for high frequencies by a bypass capacitor 77 connected from such juncture to ground. A damping resistor 82 is connected across the first primary winding 73, the resistive value of the resistor 82 being chosen to provide critical damping for the resonant circuit formed by the primary inductance of the transformer 68 and the stray capacitance of the circuit. The total stray capacitance may be represented by a capacitor, indicated by dashed lines 83 in FIGURE 3, connected across the primary windings 73 and 74. The remainder of the circuit is identical to the bridge, bias circuit and output circuit shown in FIGURE 1, and this includes current limiting resistor 23', tunnel diode 24', and balancing resistor 26' interconnected as hereinbefore described. The bridge 25' has balanced secondary windings in the transformer 68.

Considering now the operation of the circuit of FIGURE 3, when a pulse of electron current occurs in the photomultiplier tube 13', a negative voltage pulse 84 is induced into the secondary windings 22'. Since the inductance of the transformer 68 and the stray circuit capacitance 83 form a resonant circuit, ringing or a voltage reversal occurs, giving a positive pulse 86. The damping resistor 82 stops or damps the ringing after one cycle, thus effectively duplicating the zero-crossing signal 17 of FIGURE 1.

The circuits of FIGURES 1 and 3 are preferably used in somewhat different situations owing to special characteristics of each. The circuit of FIGURE 3 avoids the use of the clipping line 16 and the transmission line 18 of the FIGURE 1 circuit, both of which may, in some circumstances, create undesired reflections along with desired effects. However, the circuit of FIGURE 3 differs from that of FIGURE 1 in that it must be disposed proximal to the phototube 13 so that the stray capacitance does not become excessive.

In one embodiment of the circuit of FIGURE 3, the resonant frequency of the transformer 68 primary circuit is 80 megacycles, the dynamic amplitude range was approximately one hundred to one between the threshold level where the bridge first unbalances and the saturation level where excessive signal feed-through occurs. The dead time of the circuit is less than 25 nanoseconds and the coaxial lines are operated at 125 ohms impedance. Time definition of the original photomultiplier pulse is maintained to better than 0.5 nanosecond ($0.5 \cdot 10^{-9}$ sec.) over a twenty to one dynamic range by the output pulse. The sensitivity is sufficient to allow operation from a single photo electron at the cathode of the photomultiplier. The output pulse 52 typically has a base width of nine nanoseconds.

Variations in the circuit may be made without departing from the basic concept. For instance, the polarity of the pulses applied to the input may be inverted from that shown by alternating the connections to the tunnel diode 24 and adapting the succeeding amplifier for receiving negative pulses. Similarly, the transformer 21 in the bridge 25 may be replaced by other passive elements and the input signal may be applied across such elements, no change in the fundamental operation of the bridge being engendered thereby. If the resistor 26 is replaced or supplemented by a series connected semiconductor diode such as a tunnel rectifier, better balancing of the bridge over a wide voltage range is obtained. It is possible to eliminate the differentiator following the bridge by such means since the bridge will be balanced at all times except in the negative resistance region 64 of the curve and an output signal is produced only when the bridge is crossing or operating in such region.

Thus numerous variations may be made within the spirit and scope of the invention and it is not intended to limit the invention except as defined in the following claims.

What is claimed is:

1. In a discriminator circuit, the combination comprising a length of transmission line having a center conductor and a shield with one end of the center conductor connected to a source of input signals and having the other end of said center conductor connected to said shield, a bridge circuit having first and second and third and fourth arms, first and second and third impedance elements in said first and second and third arms respectively, a tunnel diode in said fourth arm, means coupling a source of electrical pulse input signals across said first and second impedances, an output circuit connected across said second and third impedances, and a bias voltage source connected to said tunnel diode.

2. A discriminator circuit as described in claim 1 wherein said means coupling a source of input signals across said first and second impedances is the primary winding of a transformer of which said first and second impedance elements are secondary windings.

3. In a discriminator circuit, the combination comprising a critically damped resonant circuit having means for coupling to a source of input signals, a bridge having a first and second and third and fourth arms, a first and second and third impedance in said first and second and third arms respectively, a tunnel diode in said fourth arm, means coupling said resonant circuit to said first and second arms, an output circuit connected across said second and third arms, and a bias voltage source connected across said tunnel diode.

4. In a discriminator circuit, the combination comprising a transformer having a primary winding and a center tapped secondary winding, a tunnel diode, a resistor connected in series with said tunnel diode across said secondary winding, said resistor having an impedance equal to that of said tunnel diode when said diode is conducting linearly, an output circuit connected from the center-tap on said secondary winding to the juncture of said diode and said resistor, and a bias potential source coupled to said tunnel diode.

5. A discriminator circuit as described in claim 4 and further characterized by a photomultiplier tube having an anode connected to the primary winding of said transformer, and a critical damping resistor connected across at least a portion of said primary winding.

6. A discriminator circuit as described in claim 4 wherein said bias source is connected from the center-tap of said secondary winding to the juncture of said resistor and said tunnel diode.

7. In a pulse amplitude discriminator circuit, the combination comprising a bridge circuit having a first and second and third and fourth arms, a first and second and third impedance in said first and second and third arms respectively, a tunnel diode connected in said fourth arm, a bias potential source connected across said tunnel diode, a differentiation circuit coupled to the juncture of said third and fourth arms and to the juncture of said first and second arms, and a rectifier connected to the output of said differentiation circuit.

8. In a pulse discriminator circuit, the combination comprising a transformer having a primary winding connected to an input pulse source and having first and second secondary windings, said first and second secondary windings being connected in series, a section of coaxial transmission line having a central conductor and an outer shield with the central conductor connected at one end to said pulse source and at the other end to the outer shield, a current limiting resistor, a tunnel diode connected in series with said current limiting resistor, a balancing resistor connected in series with said tunnel diode and said current limiting resistor, said balancing resistor having an impedance equal to the sum of the resistances of said current limiting resistor and the positive resistance of said tunnel diode when such diode is conducting linearly, means connecting said series combination of said current limiting resistor and said tunnel diode and said balancing resistor across said first and second secondary windings, an output circuit connected from the juncture of said first and second secondary windings to the juncture between said balancing resistor and the series combination of said current limiting resistor and said tunnel diode.

9. In a discriminator circuit, the combination comprising a bridge having first, second, third and fourth arms, an electrical pulse signal input means connected between the juncture of said fourth and first arms and the juncture of said second and third arms of said bridge, a zero-crossing circuit connected to said signal input means and being of the class converting an input pulse to a single cycle zero-crossing signal, first, second and third impedance elements disposed respectively in said first, second and third arms of said bridge, a tunnel diode disposed in said fourth arm of said bridge, a bias potential source applied across said tunnel diode, and a signal output circuit coupled across the juncture of said first and second arms and the juncture of said third and fourth arms of said bridge.

References Cited in the file of this patent
UNITED STATES PATENTS

| | | |
|---|---|---|
| 3,030,522 | Fennick | Apr. 17, 1962 |
| 3,065,636 | Pfann | Nov. 27, 1962 |

OTHER REFERENCES

"Fast Tunnel Diode Circuits for Detectors," by Bert and Shrader, Nuclear Instruments and Methods 13, 1961, pages 177–182 North-Holland Publishing Co.